United States Patent [19]
Morishita

[11] Patent Number: 5,740,216
[45] Date of Patent: Apr. 14, 1998

[54] VERTICAL SEISMIC ISOLATION STRUCTURE OF COMMON DECK SYSTEM FOR NUCLEAR REACTOR COMPONENTS

[75] Inventor: Masaki Morishita, Mito, Japan

[73] Assignee: Doryokuro Kakunenryo Kaihatsu Jigyodan, Tokyo-to, Japan

[21] Appl. No.: 520,785

[22] Filed: Aug. 30, 1995

[30] Foreign Application Priority Data

Dec. 12, 1994 [JP] Japan ............................. 6-332032

[51] Int. Cl.$^6$ ............................................ G21C 13/04
[52] U.S. Cl. ..................... 376/285; 376/293; 376/461; 52/167.4; 248/630
[58] Field of Search .......................... 376/285, 286, 376/461, 293, 402, 403; 248/630; 52/167.1, 167.4, 167.6; 405/229

[56] References Cited

U.S. PATENT DOCUMENTS

| | | | |
|---|---|---|---|
| 3,793,143 | 2/1974 | Muller | 376/403 |
| 4,295,934 | 10/1981 | Robin | 376/403 |
| 4,681,731 | 7/1987 | Sharbaugh | 376/285 |
| 4,744,941 | 5/1988 | Bacher et al. | 376/285 |
| 4,761,261 | 8/1988 | Garabedian | 376/285 |
| 4,786,461 | 11/1988 | Veronesi et al. | 376/285 |
| 4,938,633 | 7/1990 | Wu et al. | 405/229 |
| 5,158,741 | 10/1992 | Boardman et al. | 376/403 |
| 5,190,720 | 3/1993 | Hunsbedt et al. | 376/285 |
| 5,223,210 | 6/1993 | Hunsbedt et al. | 376/285 |

FOREIGN PATENT DOCUMENTS 7-103285   4/1995   Japan.

OTHER PUBLICATIONS

Preliminary Report of 1994 Fall Meeting of the Atomic Energy Society of Japan (Sep. 28–30, 1994); "D74: A Conceptual Study on Vertical Seismic Isolation for Fast Reactor Components", published Sep. 5, 1994 (In Japanese language with English translation).

House Journal "DONEN", Dec. 1994, published Dec. 1, 1994 by Doryokuro Kakunenryo Kaihatsu Jigyodan (In Japanese language with English translation).

*Primary Examiner*—Harvey E. Behrend
*Attorney, Agent, or Firm*—Wenderoth, Lind & Ponack

[57] ABSTRACT

A vertical seismic isolation structure is capable of achieving vertical seismic isolation of nuclear reactor components connected to each other by primary pipings, while suppressing the relative displacement with respect to the primary pipings. A nuclear reactor vessel, circulating pumps and heat exchangers, all of which are connected to each other by primary pipings in which a coolant is circulated, are mounted on a common deck. Vertical seismic isolators each of which has laminated large coned disc springs and is capable of expanding and contracting in only the vertical direction are installed on the top of a concrete wall surrounding the respective nuclear reactor components. The common deck is placed on all the vertical seismic isolators so as to support the entire seismic isolation structure (the common deck, the nuclear reactor components, etc.).

2 Claims, 3 Drawing Sheets

VERTICAL SEISMIC ISOLATION STRUCTURE OF COMMON DECK SYSTEM FOR NUCLEAR REACTOR COMPONENTS

BACKGROUND OF THE INVENTION

The present invention relates to a common-deck type vertical seismic isolation structure in which a nuclear reactor vessel and primary reactor components are mounted on a single common deck having a slab structure and the common deck is supported by large coned disc springs provided around the respective reactor components. This structure is useful for providing seismic isolation support for a fast breeder reactor, a light water reactor or the like in which large heavy reactor components are interconnected by pipings.

Major conventional seismic isolation systems are intended for horizontal earthquake motion. For example, nuclear facilities adopt an arrangement in which laminated rubber bearings are dispersed at the base of a construction. This type of seismic base isolation is capable of greatly reducing horizontal seismic forces, but allows vertical vibration components to be transmitted without being reduced.

In conventional arrangements for vertical seismic isolation, a multiplicity of coil springs are disposed so as to fit reactor components (for example, in a circular form). However, if coil springs are used, an enormous number of seismic isolation devices will have to be installed, so that not only layout problems (difficulty in configuration) take place but also a maintenance space becomes difficult to secure. In addition, since such a conventional arrangement for vertical seismic isolation has a structure in which a multiplicity of seismic isolators (coil springs) disposed in position are independently displaceable, it is substantially impossible to avoid an excessive rocking vibration (rotational motion relative to an axis in a horizontal plane) to occur during a small horizontal earthquake motion as well.

The major feature of the vertical seismic isolation, unlike that of the horizontal seismic isolation, is that the direction of support for the weight of each of the components and the direction of support for seismic isolation are the same. This feature involves a high degree of technical difficulty. The key to such vertical seismic isolation is how to suppress or avoid static deflection (downward motion) due to vertical flexible support in a seismic isolation structure as well as rocking vibrations due to horizontal motions. To achieve a vertical seismic isolator capable of solving this problem, the present inventor has previously proposed a structure in which a plurality of large coned disc springs are laminated and inserted in a cylinder in such a manner as to expand and contract in only the vertical direction (Japanese Patent Laid-open Specification No. 7-103285).

In general, in nuclear reactor plants, large heavy reactor components such as a reactor vessel, circulating pumps and heat exchangers are connected to each other by primary pipings (primary coolant system pipings). In such a nuclear reactor plant, it is necessary to avoid as much as possible the relative displacement between the reactor components to be loaded onto the primary pipings. The primary pipings contain a coolant and are as important as the reactor vessel in terms of safety. Seismic isolation devices are, therefore, required to have high stiffness with respect to the degree of freedom in any direction other than the vertical direction, whereas, from the point of view of safety, they are required to maintain the ability to support a load even if a breakage occurs.

If the respective reactor components are individually supported for seismic isolation by the prior art, acceleration (seismic load) occurring in the components or the pipings can be suppressed to a great extent. However, the response displacement of the components or the pipings becomes large, and each of the components show different displacement. In an extreme case, the components connected by the pipings may be displaced in directions opposite to each other. As a result, the difference in displacement between the components will be loaded onto the primary pipings as large relative displacement, so that a serious problem will occur with the structural integrity of piping.

SUMMARY OF THE INVENTION

An object of the present invention is, therefore, to provide a vertical seismic isolation structure capable of achieving vertical seismic isolation of reactor components, connected to each other by primary pipings, while suppressing the relative displacement with respect to the primary pipings, and also capable of suppressing rocking vibrations.

The present invention provides a common-deck type vertical seismic isolation structure for nuclear reactor components, characterized in that a nuclear reactor vessel, circulating pumps and heat exchangers, all of which are connected to each other by primary pipings in which a coolant is circulated, are mounted on a common deck, vertical seismic isolators each of which has laminated large coned disc springs and is capable of expanding and contracting in only the vertical direction are installed on the top of a concrete wall surrounding the respective nuclear reactor components, and the common deck is placed on all the vertical seismic isolators so as to support the entire structure (the common deck, the nuclear reactor components, etc.).

All of the reactor components are mounted on the common deck, and the common deck as a whole is supported for seismic isolation. Although the common deck itself makes a displacement response, the motions of the respective reactor components mounted on the common deck are the same, so that no relative displacement load is loaded onto the primary pipings which interconnect the components. In addition, rocking vibrations are difficult to occur during a horizontal earthquake owing to the high rotational stiffness of the coned disc springs which are used as seismic isolation elements, as well as owing to the flat shape of the entire seismic isolation structure which is formed as the common deck and the reactor components each of which is suspended with the distance between its center of gravity and its support point being made as small as possible.

PREFERRED EMBODIMENTS OF THE INVENTION

Figure 1:
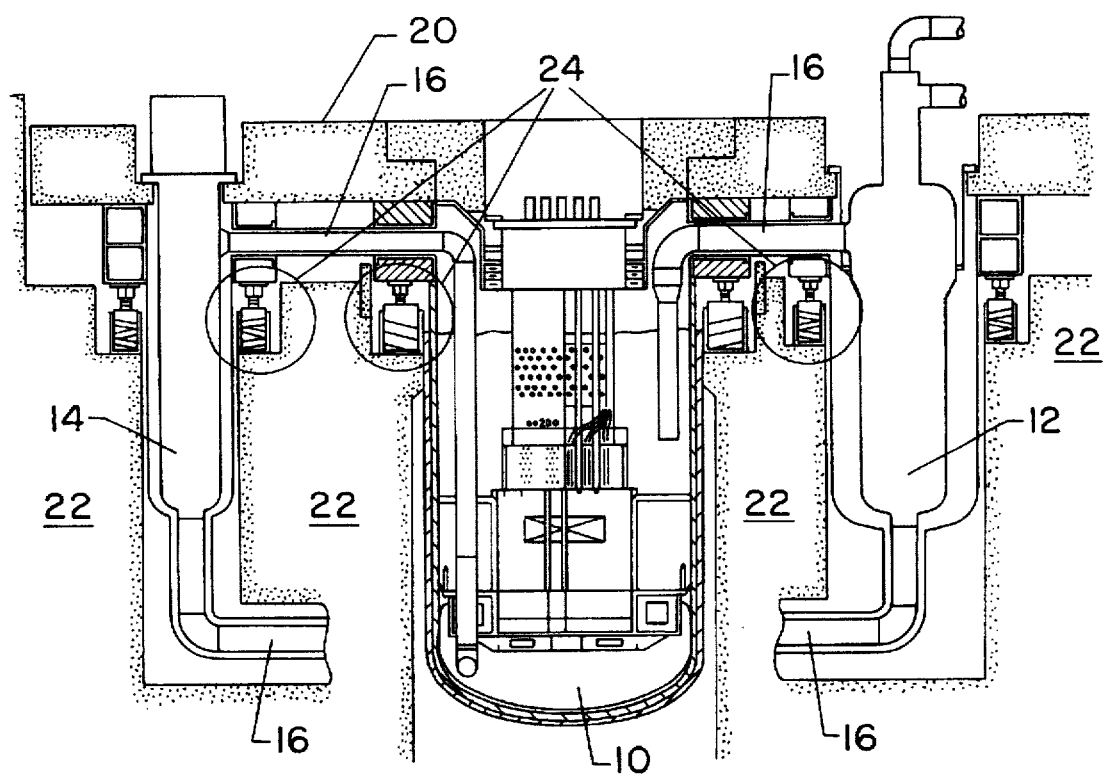
FIG. 1 is a view showing the entire constitution of one embodiment of a vertical seismic isolation structure according to the present invention.
Figure 2:
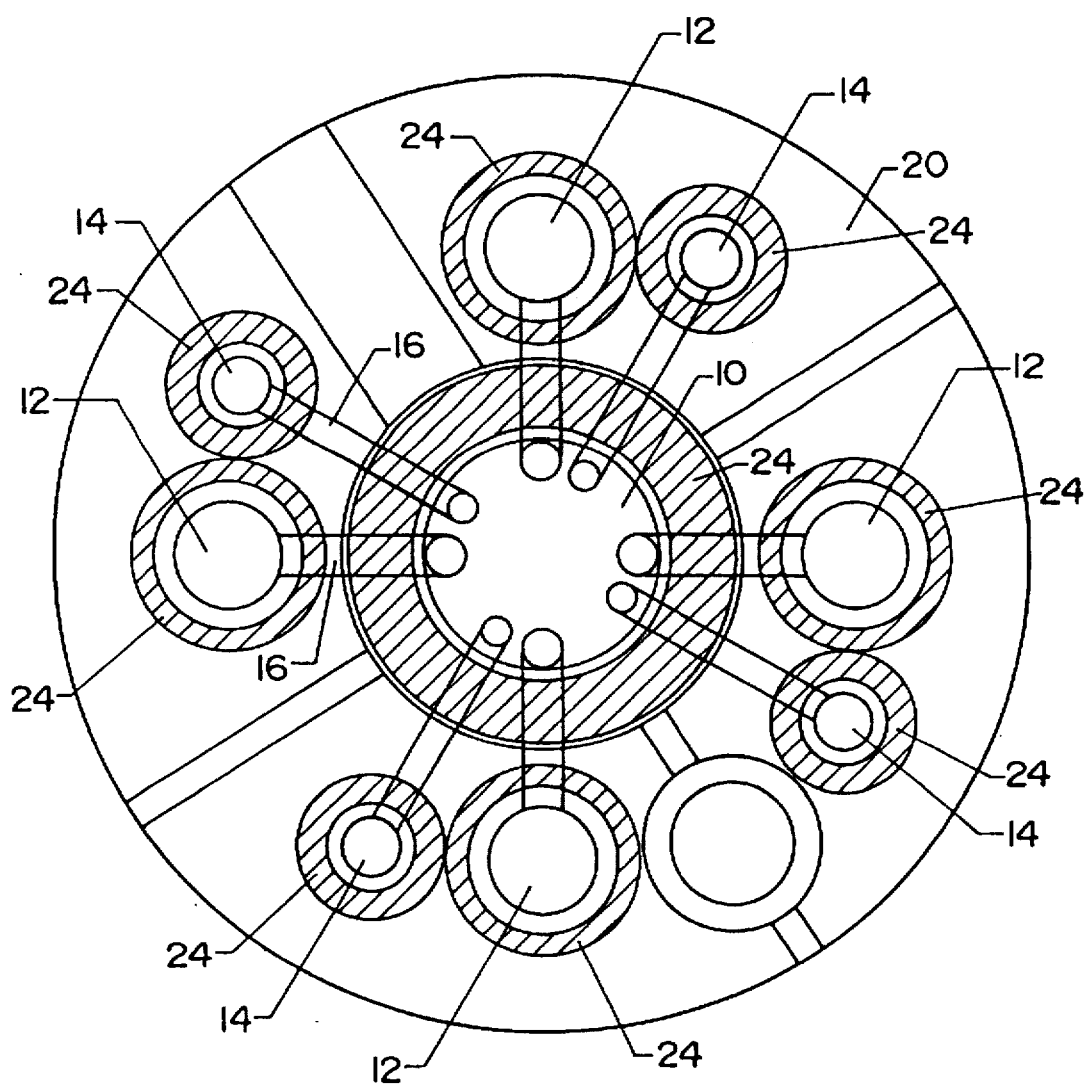
FIG. 2 is a top plan view showing the arrangement of nuclear reactor components and vertical seismic isolators.

FIG. 1 is a view showing the entire constitution of one embodiment of a vertical seismic isolation according to the present invention. FIG. 2 is a top plan view of the arrangement of individual components. This embodiment is an example of a liquid sodium-cooled fast breeder reactor. A primary coolant system having four lines is installed around a nuclear reactor vessel 10 which is positioned in the center, and each of the lines has an intermediate heat exchanger 12 and a primary circulating pump 14. The reactor vessel 10 and the intermediate heat exchanger 12 and the primary circulating pump 14 of each of the lines are connected to each other by primary pipings 16 of the coolant system.

In the present invention, a total of nine reactor components (the reactor vessel 10, the intermediate heat exchangers 12 and the primary circulating pumps 14) are suspended from a circular common deck (one slab structure). Ring-shaped, vertical seismic isolators 24 are installed in such a manner as to surround the respective reactor components on the top of a concrete wall 22 which surrounds the reactor components, and a common deck 20 is fixedly placed on the total of nine vertical seismic isolators 24. The nine shaded portions shown in FIG. 2 represent the vertical seismic isolators 24, respectively. Each of the vertical seismic isolators 24 has a plurality of large coned disc springs of a diameter of several to some tens of meters which are laminated around the corresponding one of the reactor components so as to expand and contract in only the vertical direction (so as not to travel in the horizontal plane).

Figure 3:
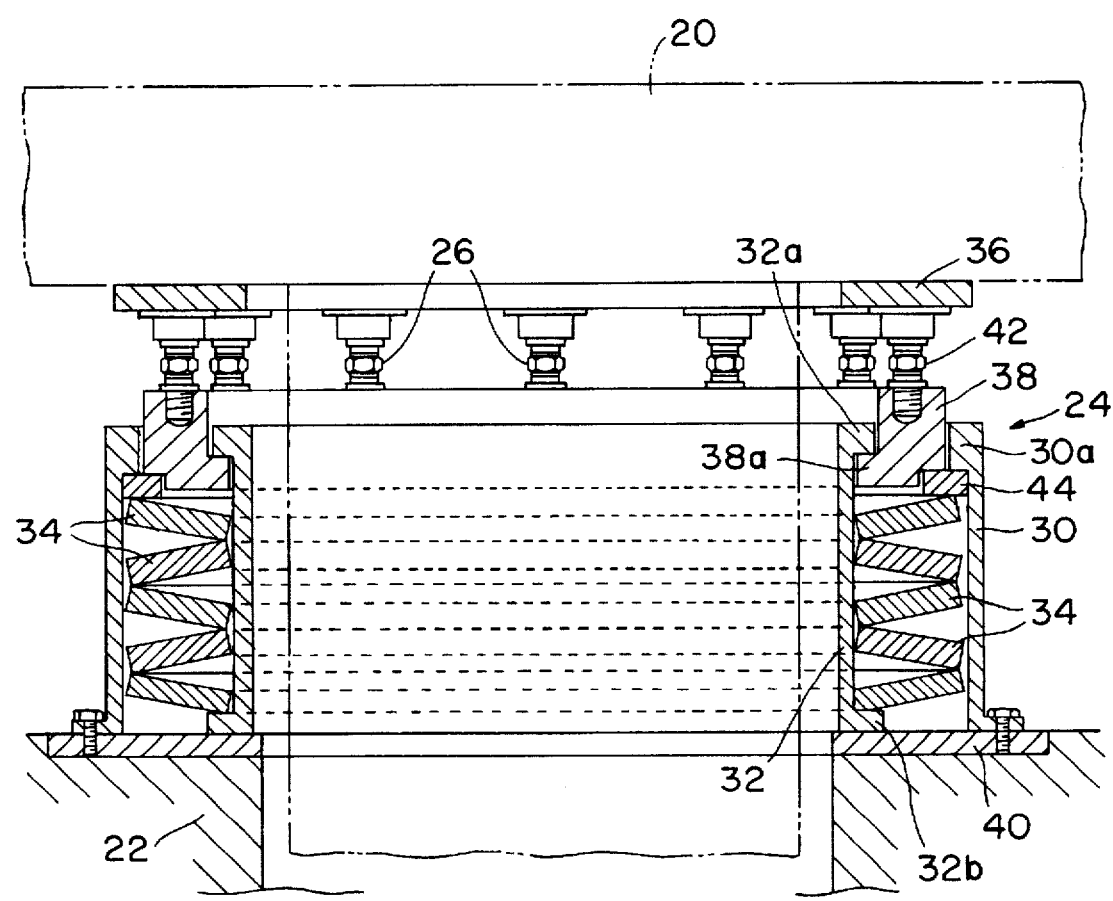
FIG. 3 is an explanatory view showing one example of the vertical seismic isolators.

FIG. 3 shows the details of the vertical seismic isolators 24. Each of the vertical seismic isolators 24 mainly includes an external cylinder 30 and an internal cylinder 32 which are coaxially disposed, a plurality of large coned disc springs 34 which are laminated in the annular space between the external cylinder 30 and the internal cylinder 32, a top plate 36 on which the common deck 20 is placed, and a pressure ring 38 which can be moved up and down in the annular space.

The external cylinder 30 is fixed to a base plate 40 at its bottom end by bolts and has an inward rim 30a at its top end. The base plate 40 is fixed to the concrete wall 22 of a construction or the like by bolts. The internal cylinder 32 is a movable cylinder which is coaxially inserted in the external cylinder 30. Outward rims 32a and 32b are respectively provided integrally with the top and bottom ends of the internal cylinder 32. The pressure ring 38 is inserted from above into the annular space between the external cylinder 30 and the internal cylinder 32 in such a manner as to be movable up and down therein. The pressure ring 38 has a structure in which an inward rim 38a, which is engageable with the outward rim 32a of the top end of the internal cylinder, is provided integrally with the bottom portion of the inside face of the pressure ring 38. The top plate 36 is positioned above the pressure ring 38, and the top plate 36 and the pressure ring 38 are joined together by a plurality of connecting bolts 42 which are spaced apart from each other at an equal pitch. The top plate 36 serves to directly support the common deck 20. The coned disc springs 34 are laminated alternately upside down in the annular space between the external cylinder 30 and the internal cylinder 32. The uppermost end of the coned disc springs 34 is engaged with the inward rim 30a of the top end of the external cylinder 30 via an annular element 44, while the lowermost end of the coned disc springs 34 is engaged with the outward rim 32b of the bottom end of the internal cylinder 32. The laminated coned disc springs 34 are capable of being pressed by the pressure ring 38 via the annular element 44.

It is assumed that the common deck 20 is moved up and down by vertical seismic forces. While the common deck 20 is moved upward, the pressure ring 38 presses the internal cylinder 32 upward, so that a compressive force is applied to the coned disc springs 34. While the common deck 20 is moved downward, the pressure ring 38 directly compresses the coned disc springs 34. In either case, the vibration of the common deck 20 is isolated by the compressive deformation of the coned disc springs 34. In this manner, in these vertical seismic isolators, the forces applied during the respective upward and downward motions are transmitted in the direction in which the coned disc springs are compressed. Since the coned disc springs are employed only in the mode of compressive deformation, stable characteristics can be obtained.

Accordingly, if the concrete structure of the construction vibrates in the vertical direction during an earthquake, the vibration is transmitted to the entire seismic isolation structure while being mitigated by the coned disc springs 34. The acceleration transmitted at this time is reduced to a remarkable extent by setting a natural frequency to an appropriate value (normally 1–5 Hz, for example, about 2.5 Hz). The natural frequency is determined by the stiffness (spring constant) of the coned disc springs 34 and the entire seismic isolation structure (the common deck having a box structure of 2 m thick and all the reactor components; about 10,000 tons in total weight). In addition, since coned disc springs are combined in use, a damping effect due to the friction between the coned disc springs is produced. Since the coned disc springs are circumferentially joined together and individually restrained, it is impossible that they undergo local free deformation. Accordingly, unlike coil springs, the coned disc springs exhibit extremely high stiffness with respect to rocking vibrations.

According to the present invention, each of the reactor components is suspended from the common deck, and the vertical seismic isolators each having the laminated large coned disc springs are disposed around the respective reactor components so that the common deck can be collectively supported for seismic isolation. Therefore, since the common deck itself makes a displacement response but the motions of the respective reactor components are the same, it is possible to substantially avoid the problem of a relative displacement load applied to the primary pipings, which problem takes place if the reactor components are individually supported for seismic isolation. The rocking vibration, which is a problem posed by vertical seismic isolation, is suppressed to a further extent not only by the use of the above-described coned disc springs which are seismic isolation elements each having high rotational stiffness, but also by forming the entire seismic isolation structure into a flat shape to make the distance between its center of gravity and its support point as short as possible. In addition, even if an excessive load is applied to the coned disc springs, they do not lose an ultimate support function.

If the vertical seismic isolation structure according to the present invention and the horizontal seismic base isolation of the entire construction which uses laminated rubber bearings are combined with each other, three-dimensional seismic isolation for the entire reactor plant can be realized. The horizontal seismic base isolation has an arrangement in which laminated rubber bearings are dispersed at the base of the entire construction, as stated previously in the description of the prior art. Horizontal seismic forces are greatly reduced by the horizontal seismic base isolation. Although horizontal seismic base isolation is incapable of preventing the transmission of vertical vibration components, the vertical earthquake motion is greatly reduced by the vertical seismic isolators in the above-described manner. In consequence, the entire seismic isolation structure is capable of providing horizontal and vertical seismic isolation. This means that an earthquake load which often places restrictions on the design of plant components can be remarkably reduced, whereby it is possible to greatly improve seismic safety and economy.

As described above, the present invention is arranged in such a manner that the reactor components which are connected to each other by the primary pipings in which a coolant is circulated are secured to the common deck, the vertical seismic isolators each having laminated large coned disc springs are installed on top of the concrete wall which surrounds the respective reactor components, and the common deck is placed on all the vertical seismic isolators. Accordingly, it is possible to achieve vertical seismic isolation of the entire seismic isolation structure (a decrease in vertical acceleration) while suppressing the relative displacement response of the primary pipings to a great extent, and it is also possible to suppress rocking vibrations.

What is claimed is:

1. A common-deck type vertical seismic isolation structure for nuclear reactor components, characterized in that a nuclear reactor vessel, circulating pumps and heat exchangers, all of which are connected to each other by primary pipings in which a coolant is circulated, are mounted on a common deck, vertical seismic isolators each of which has laminated large coned disc springs and is capable of expanding and contracting in only the vertical direction are installed on the top of a concrete wall surrounding the respective nuclear reactor components, and the common deck is placed on all the vertical seismic isolators.

2. A common-deck type vertical seismic isolation structure according to claim 1, wherein each of the vertical seismic isolators includes an external cylinder fixed to a base plate at its bottom end and having an inward rim at its top end, an internal cylinder movably accommodated in the external cylinder and provided with outward rims at its respective top and bottom ends, a plurality of coned disc springs laminated alternately upside down in an annular space between the external cylinder and the internal cylinder, a pressure ring positioned on top of the coned disc springs and movable up and down in the annular space, the pressure ring having at the bottom end of its inside face an inward rim which is engageable with the outward rim of the top end of the internal cylinder, and a top plate joined to the pressure ring by a plurality of connecting bolts, the common deck being placed on the top plate.

* * * * *